United States Patent [19]
Ronai

[11] Patent Number: 6,030,021
[45] Date of Patent: Feb. 29, 2000

[54] BED COVER ASSEMBLY FOR A VEHICLE BED

[76] Inventor: Christian Ronai, 1166 Bay Street, Suite 505, Toronto, Ontario, Canada, M5S 2X8

[21] Appl. No.: 08/775,963

[22] Filed: Jan. 3, 1997

[51] Int. Cl.⁷ ..................................................... B60P 7/04
[52] U.S. Cl. ................. 296/98; 296/100.12; 296/100.18
[58] Field of Search .................................. 296/32, 34, 36, 296/98, 100.01, 100.04, 100.07, 100.15, 100.16, 100.17, 100.18, 100.12

[56] References Cited

U.S. PATENT DOCUMENTS

| | | | |
|---|---|---|---|
| 4,807,921 | 2/1989 | Champie, III et al. | 296/98 |
| 4,923,240 | 5/1990 | Swanson | 296/100.18 |
| 5,096,250 | 3/1992 | Menz | 296/98 |
| 5,186,514 | 2/1993 | Ronai | 296/100.18 |
| 5,251,951 | 10/1993 | Wheatley | 296/100.15 |
| 5,275,458 | 1/1994 | Barben et al. | 296/100.18 |
| 5,385,377 | 1/1995 | Girard | 296/36 |
| 5,480,206 | 1/1996 | Hathaway et al. | 296/36 |
| 5,526,866 | 6/1996 | Flentge | 160/380 |
| 5,531,497 | 7/1996 | Cheng | 296/100.01 |

FOREIGN PATENT DOCUMENTS 1259361  9/1989  Canada .

*Primary Examiner*—Dennis H. Pedder
*Attorney, Agent, or Firm*—Baker & Daniels

[57] ABSTRACT

A bed cover assembly for a vehicle bed includes a pair of tracks to be secured to opposed sidewalls of the vehicle bed. A cover extendible between and engageable with the tracks over their lengths, carries formations which co-operate with formations on the tracks when the cover is in tension. A releasable locking mechanism maintains the cover under tension to inhibit separation of the co-operating formations when they are in mating engagement.

44 Claims, 14 Drawing Sheets

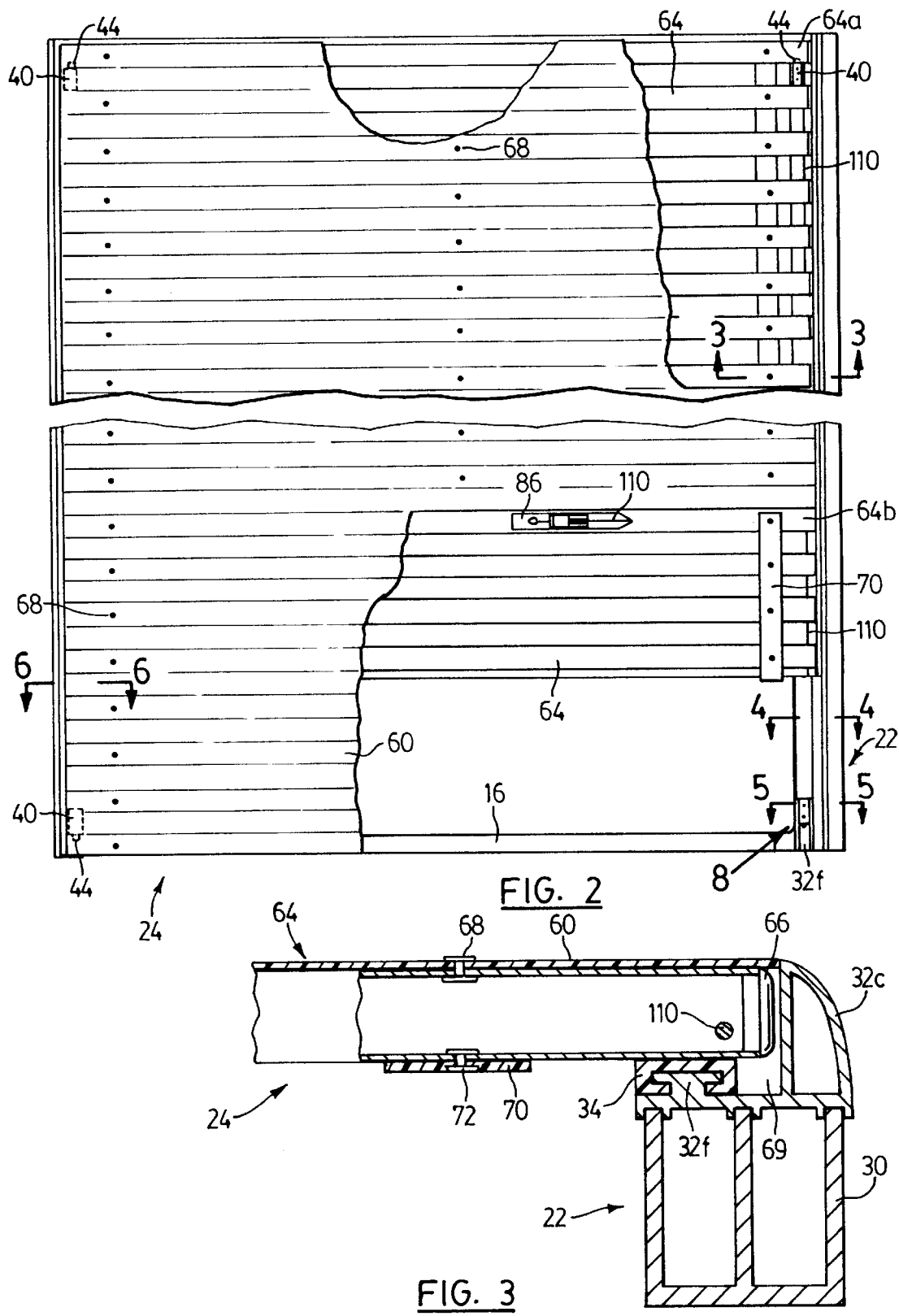

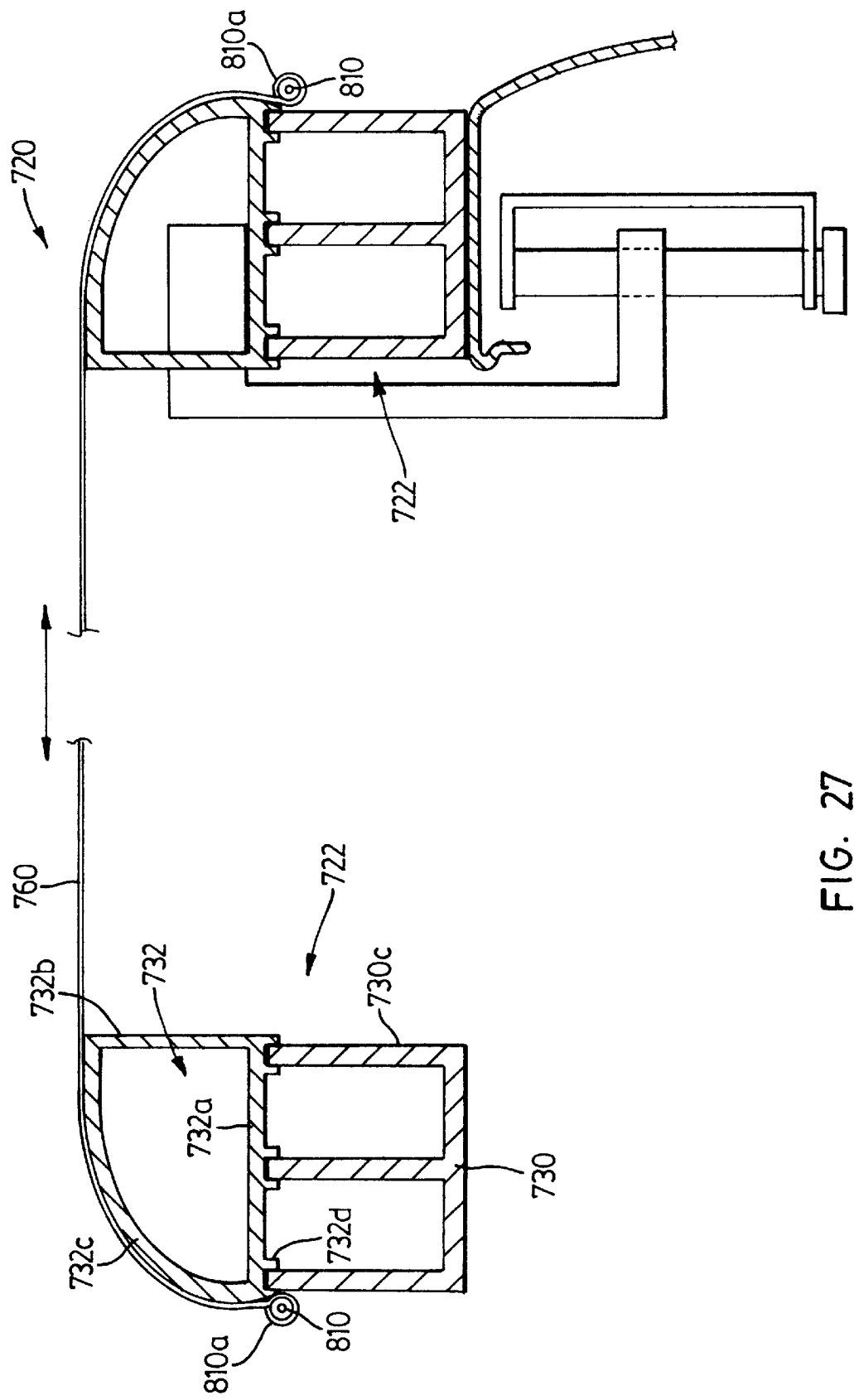

BED COVER ASSEMBLY FOR A VEHICLE BED

FIELD OF THE INVENTION

The present invention relates to covers for load containers and in particular to a bed cover assembly for a vehicle bed such as for example, a pickup truck bed.

BACKGROUND OF THE INVENTION

Many vehicles are provided with load containers commonly referred to as "beds". Pickup trucks are an example of such vehicles and as is well known, include generally rectangular open-topped beds onto which loads to be transported can be placed. Unfortunately, since the beds are open-topped, articles placed on the beds remain exposed and are prone to theft as well as to damage due to inclement weather.

To inhibit theft and damage due to inclement weather, many different types of bed covers have been considered. For example, one type of bed cover is in the form of a rigid, cabin to overlie the bed. The cabin is secured to the bed at various locations by way of fasteners. Unfortunately, this type of bed cover is expensive, difficult to remove from the bed and when installed allows articles to be placed within the bed only from the rear of the pickup truck.

To deal with these problems, alternative bed covers have been considered. For example, one common, inexpensive bed cover for a pickup truck is in the form of a waterproof tarpaulin fixed by snaps around the perimeter of the bed. Unfortunately, these bed covers are difficult to install and remove, difficult to store, they do not support the weight of a snowfall very well, and they offer little or no theft protection.

Another bed cover for a pickup truck is disclosed in U.S. Pat. No. 4,807,921 to Champy et al. The Champy et al. bed cover is in the form of an articulated metal cover which slides in tracks running along the sides of the bed and which locks into the tailgate. Although this bed cover provides a secure rigid cover for the bed and thereby inhibits theft, problems exist in that the bed cover occupies space within the bed, it is difficult to install and is expensive to manufacture. In addition, the bed cover only opens from one end and therefore, limits access to the bed.

U.S. Pat. No. 5,186,514 to Ronai discloses a truck box cover apparatus designed to overcome the above-described deficiencies associated with pickup truck bed covers. The Ronai truck box cover apparatus includes a pair of tracks secured to opposed sidewalls of the bed. A cover is placed on the tracks from above and can be locked into position on the tracks by pivoting locking members associated with the tracks. The locking members include key-actuated locks which can be conditioned to maintain the locking members in a locked condition. The cover is sufficiently rigid so as to secure the contents in the bed and inhibit tampering when the cover is locked into position on the tracks by the locking members. The cover can be rolled or folded up from either end when the locking members are released allowing the bed to be accessed from both ends. Although this truck box cover apparatus works satisfactorily, a user must walk around the entire vehicle bed to lock and unlock each of the key-actuated locks. Accordingly, improved bed cover designs to reduce the time required to cover and uncover the vehicle bed, to simplify construction and to reduce costs are desired.

SUMMARY OF THE INVENTION

It is therefore an object of the present invention to provide a novel bed cover assembly for a vehicle bed and a vehicle incorporating the same.

According to one aspect of the present invention there is provided a bed cover assembly for a vehicle bed comprising:

a pair of tracks to be secured to opposed sidewalls of a vehicle bed;

a cover extendible between and engageable with said tracks generally over the lengths thereof to cover said vehicle bed, said tracks and cover including abutment members having cooperating formations thereon, said abutment members moving into abutment with said cooperating formations in mating engagement when said cover is in tension and extends between and engages said tracks to cover said vehicle bed thereby to inhibit lifting of said cover from said tracks; and a releasable locking mechanism to maintain said cover in tension and inhibit separation of said co-operating formations.

In one embodiment, the abutment members on the tracks are in the form of blocks adjustably supported at opposite ends of each track. The abutment members on the cover are in the form of transverse supporting end ribs secured to opposite ends of a sheet. The cooperating formations in one embodiment are in the form of retaining pins on the blocks and holes in the end ribs. In another embodiment the cooperating formations are in the form of projecting lips on the blocks and complimentary notches in the end ribs.

Preferably, the tracks are cambered with the thickest dimensions of the tracks being located generally midway along their lengths. This helps to reduce rattling when the vehicle is in motion and further inhibits lifting of the cover from the tracks.

In one embodiment, the locking mechanism includes cables running longitudinally along the sides of the cover and which pass through the transverse supporting end ribs. The cables are fixed at one end to one end rib of the cover and are adjustably attached to buckles on the other end rib of the cover. The buckles are pivotably connected to the end rib and are moveable between locked positions where the cables are placed under tension and unlocked positions where the tension is released.

In another embodiment, the locking mechanism is constituted by releasable snap-fit fasteners on the end ribs and the tracks.

Preferably, the bed cover assembly further includes tie-down straps to engage the tracks and the cover when the cover is in a rolled condition. In a preferred form, the tie-down straps are generally T-shaped and include a pair of adjustable arms and a stem. Hooks are on the ends of the arms and the stem. The hooks on the arms engage the tracks on opposite sides of the rolled cover while the hook on the stem engages a supporting rib on the cover.

In another embodiment, the abutment members on the tracks are constituted by the ends of the tracks. The cover in this embodiment includes a sheet and transverse end ribs secured to the sheet at its opposite ends, the end ribs constituting the abutment members on the cover. The tracks in this case have arcuate upper surfaces over which the sheet extends.

According to another aspect of the present invention there is provided in combination a vehicle having a bed onto which articles may be placed, said bed having a pair of opposed sidewalls; and a bed cover assembly for said bed, said bed cover assembly including a pair of tracks on opposed sidewalls of said vehicle bed; a cover extendible between and engageable with said tracks generally over the lengths thereof to cover said vehicle bed, said tracks and cover including abutment members having cooperating formations thereon, said abutment members moving into abutment with said cooperating formations in mating engagement when said cover is in tension and extends between and engages said tracks to cover said vehicle bed thereby to inhibit lifting of said cover from said tracks; and a releasable locking mechanism to maintain said cover in tension and inhibit separation of said cooperating formations.

The present invention provides advantages in that the bed cover assembly is easy to use reducing the time required to cover and uncover the vehicle bed. Also, the bed cover assembly is inexpensive to manufacture while still providing good security for the contents in the bed. In addition, the bed cover assembly design allows the bed to be accessed from either end when the bed cover assembly is in an unlocked condition.

BRIEF DESCRIPTION OF THE DRAWINGS

Embodiments of the present invention will now be described more fully with reference to the accompanying drawings in which:

FIG. 2 is a top plan view of the bed cover assembly illustrated in FIG. 1 taken in the direction of arrow 2 partially cut-away and partially folded back over itself;

FIG. 3 is a cross-sectional view of FIG. 2 taken along line 3—3;

FIG. 27 is a cross-sectional view of still yet another embodiment of a bed cover assembly in accordance with the present invention.

DESCRIPTION OF THE PREFERRED EMBODIMENT

Figure 1:
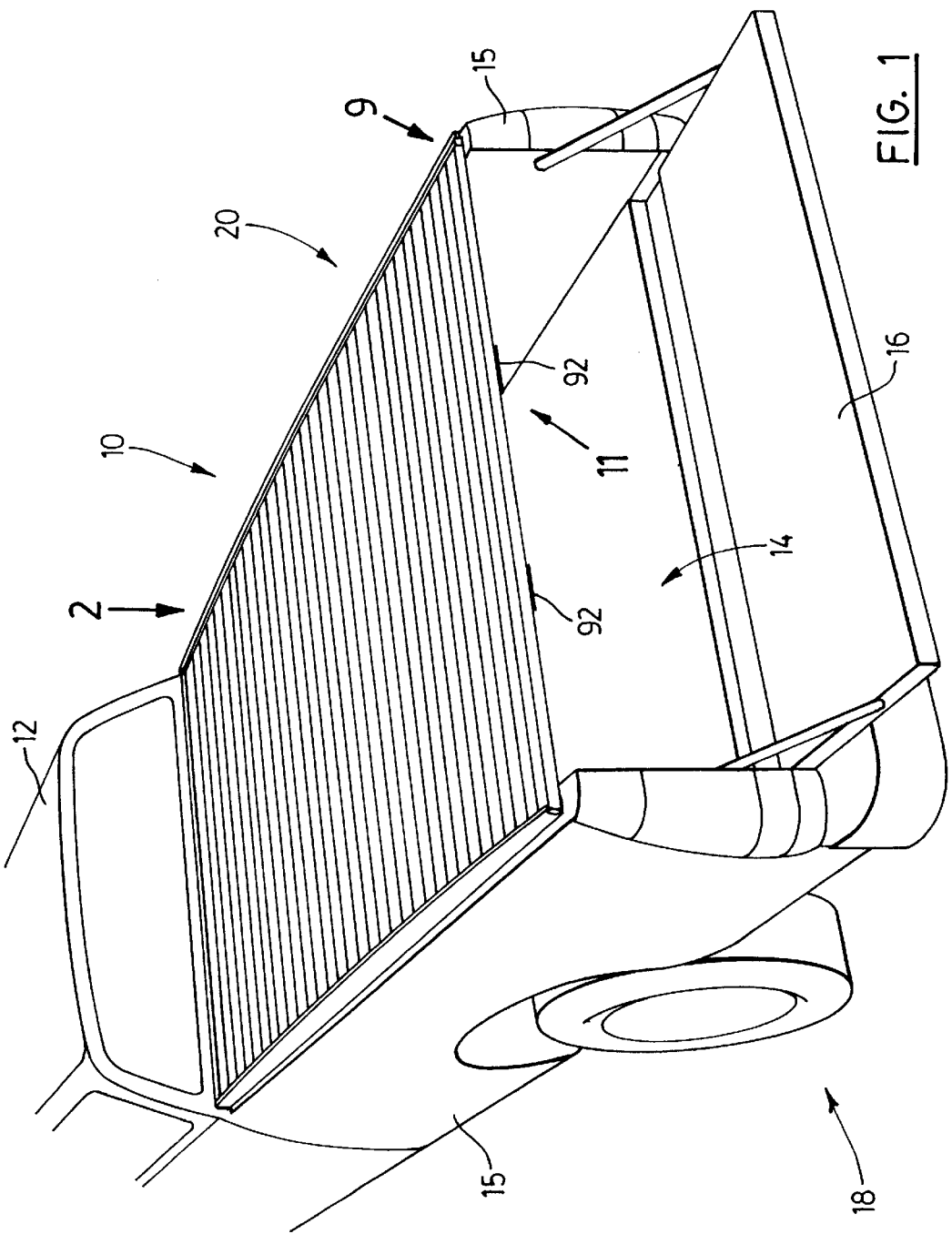
FIG. 1 is a rear perspective view of a vehicle in the form of a pickup truck having a bed cover assembly thereon in accordance with the present invention.

Referring now to FIG. 1, a vehicle in the form of a pickup truck is shown and is generally indicated to by reference numeral 10. Pickup truck 10 includes a cab 12 and a generally rectangular, open-topped bed 14 behind the cab 12. The bed 14 includes a pair of opposed sidewalls 15 and a pivotal tailgate 16 moveable between an open, generally horizontal position as shown and an upright locked position. The cab 12 and bed 14 are supported on a wheeled chassis 18 as is well known. A bed cover assembly 20 is secured to and overlies the entire open top of the bed 14 to secure the contents within the bed and inhibit theft and/or damage to the contents due to inclement weather.

FIGS. 2 to 12 better illustrate the bed cover assembly 20. As can be seen, the bed cover assembly 20 includes a pair of tracks 22, each of which is secured to the top of one of the opposed sidewalls 15. The tracks 22 are preferably formed of extruded aluminum or plastic. A flexible cover 24 extends between and engages the tracks 22 from above to overlie the vehicle bed 14. Each track 22 includes a cambered base member 30 which is thickest in dimension midway along its length. The base members 30 are preferably configured so that their dimensions at their thickest points are about ¾ to 2 inches thicker than their dimensions at their extremities. However, generally the dimensions of the base members at their thickest points will be about 1 to 1 ½ inches thicker than their dimensions at their extremities depending on the size of the vehicle bed 14.

Figure 4:
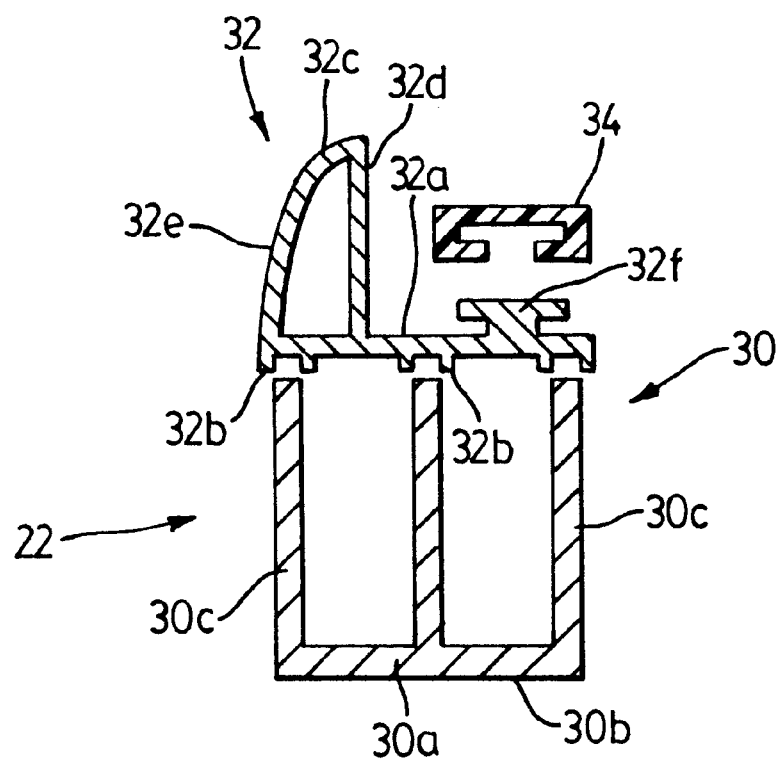
FIG. 4 is an exploded cross-sectional view of FIG. 2 taken along line 4—4.
Figure 5:
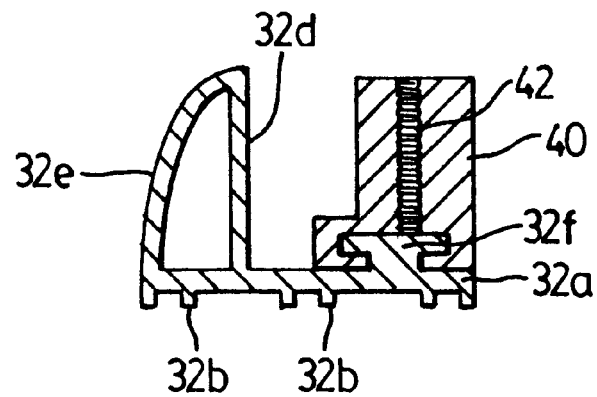
FIG. 5 is a cross-sectional view of FIG. 2 taken along line 5—5.
Figure 6:
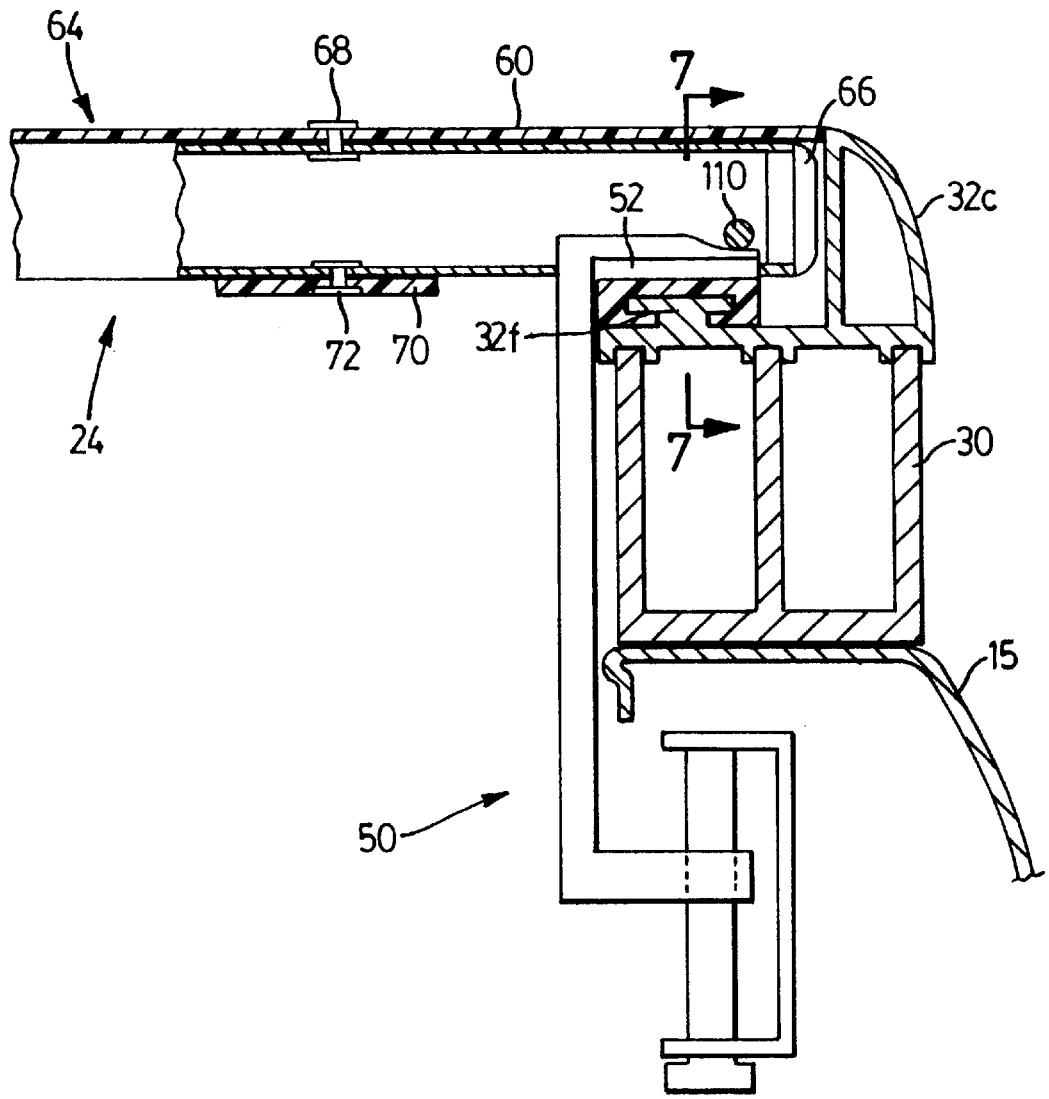
FIG. 6 is a cross-sectional view of FIG. 2 taken along line 6—6.
Figure 7:
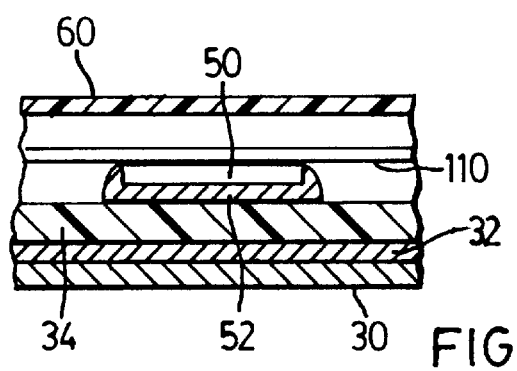
FIG. 7 is a cross-sectional view of a portion of FIG. 6 taken along line 7—7.
Figure 8:
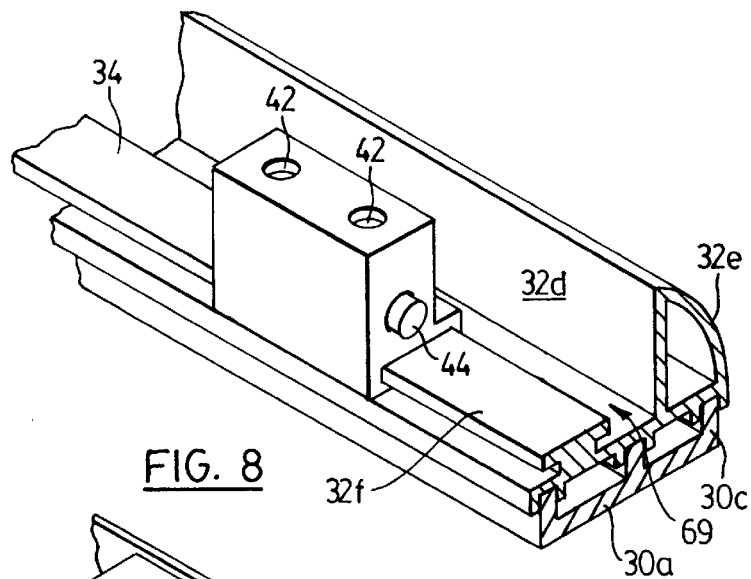
FIG. 8 is an enlarged perspective view of a portion of the bed cover assembly of FIG. 2 taken in the direction of arrow 8.
Figure 9:
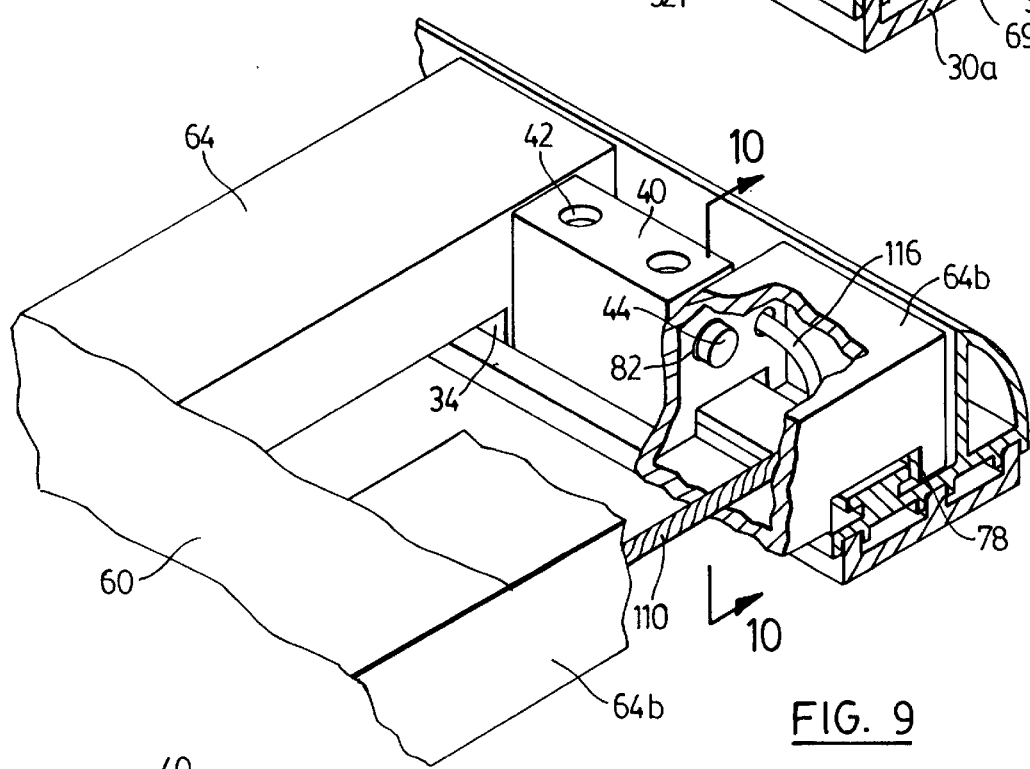
FIG. 9 is an enlarged perspective view of a portion of the bed cover assembly of FIG. 1 taken in the direction of arrow 9 and partially cut-away.

Referring now to FIGS. 3 to 5, one of the base members 30 is better illustrated. As can be seen, each base member 30 includes a base 30a having a generally planar bottom surface 30b overlying the top surface of the respective sidewall 15. Laterally spaced, longitudinally extending upright walls 30c are integrally formed with the base 30a giving the base member 30 a generally W-shaped appearance.

A generally L-shaped member 32 is attached to each of the base members 30. Each L-shaped member 32 includes a base 32a having three pairs of spaced, longitudinally extending ribs 32b depending from its bottom surface. The spacings between the ribs 32b of each pair are sized to accommodate the tops of the upright walls 30c in a snap-fit relationship to secure the L-shaped member 32 to the base member 30. A hollow upright wall 32c is integrally formed with the base 32a and presents an inner planar surface 32d and a curved exterior surface 32e. Rounded end caps (not shown) are accommodated by opposite ends of the upright wall 32c. A longitudinally extending T-shaped rail 32f is integrally formed on the base 32a and is spaced from the arm 32c. A cushion 34 formed of plastic material engages the rail 32c and covers the rail except near its opposite ends.

A pair of abutment members in the form of generally rectangular blocks 40 engage each of the rails 32f. The blocks 40 of each pair are positioned adjacent opposite ends of the respective rail 32f. The blocks 40 are slidable along the rails 32f but are secured in position on the rails 32f by way of set screws 42 passing through the blocks. Each block 40 has an outwardly extending retaining pin 44 thereon. The retaining pins 44 on the blocks 40 associated with each track 22 are positioned on the blocks 40 so that they extend from the blocks in opposite directions. A plurality of clamps 50 (typically 3 to 6 in number) are positioned at spaced locations along the length of each track 22 to secure the tracks to the top surfaces of the sidewalls 15 without interfering with the cover 24. The pads 52 on the clamps that contact the tracks 22 are toothed to inhibit sliding of the clamps. The pads 52 are also wedge-shaped to compensate for the camber of the tracks 22 and thereby maintain the clamps in a generally vertical orientation.

The cover 24 includes a generally planar sheet 60 formed of suitably strong, weather-resistant material such as for example vinyl. Hollow, generally rectangular parallelepiped, transverse supporting ribs 64 extend between opposite sides of the sheet 60 at spaced locations along the entire length of the sheet to give the cover 24 rigidity about a longitudinal axis (i.e. the lengthwise axis of the pickup truck bed 14). Caps 66 formed of plastic material are accommodated by the open ends of each rib. The sheet 60 is fastened to the top surface of each rib 64 at a plurality of locations by rivets 68. Thus, in the present example, the sheet 60 is fastened to each rib 64 at three locations, namely near the center of the rib and adjacent its opposite ends. The sides of the sheet 60 extend to the upright surfaces 32d of the tracks 22 to cover the rails 32f and inhibit water from leaking into the vehicle bed 14. Water passing between the edges of the sheet 60 and the upright surfaces 32d is collected by gutters 69 defined by the outer surfaces of the rails 32f and the upright surfaces 32d and guided to the ends of the L-shaped members 32.

Laterally spaced, longitudinally extending friction strips 70 formed of strong vinyl material span the ribs 64 excluding the end ribs 64a and 64b and are attached to the bottom surfaces of the ribs by way of rivets 72.

The end ribs 64a and 64b have transverse channels 78 formed in their bottom surfaces adjacent their ends to accommodate the rails 32f when the ribs span the tracks 22. The end rib 64a adjacent the cab 12 has a pair of holes (not shown) formed therein, with each hole being positioned adjacent an opposite end of the rib. The holes are positioned so that they accommodate the retaining pins 44 extending from the blocks 40 when the rib 64a spans the tracks 22. Similarly, the end rib 64b adjacent the tailgate 16 has a pair of holes 82 formed therein, with each hole being positioned adjacent an opposite end of the rib. The holes 82 are positioned so that they accommodate the retaining pins 44 extending from the blocks 40 when the rib 64b spans the rails 32 (see FIGS. 9 and 10). Cutouts 86 are formed in the bottom surface of the rib 64b to expose portions of its interior.

A locking mechanism is provided on the cover 24 to place the cover 24 under tension and bring the cooperating holes 82 and retaining pins 44 into mating engagement, thereby to inhibit lifting of the cover 24 from the tracks 22 and sliding of the cover along the tracks. The locking mechanism 90 includes a pair of buckles 92 resembling "ski-boot clips", each of which is pivotably connected to the rib 64b at a respective one of the cutouts 86. Each buckle 92 includes a pair of spaced arms 94. One end of each arm 94 is attached to an adjacent sidewall of the rib 64b by way of a pivot pin 96. The other ends of the arms 94 are spanned by a bridge 98 having an outwardly and downwardly extending tab 100 at its distal end.

Figure 12:
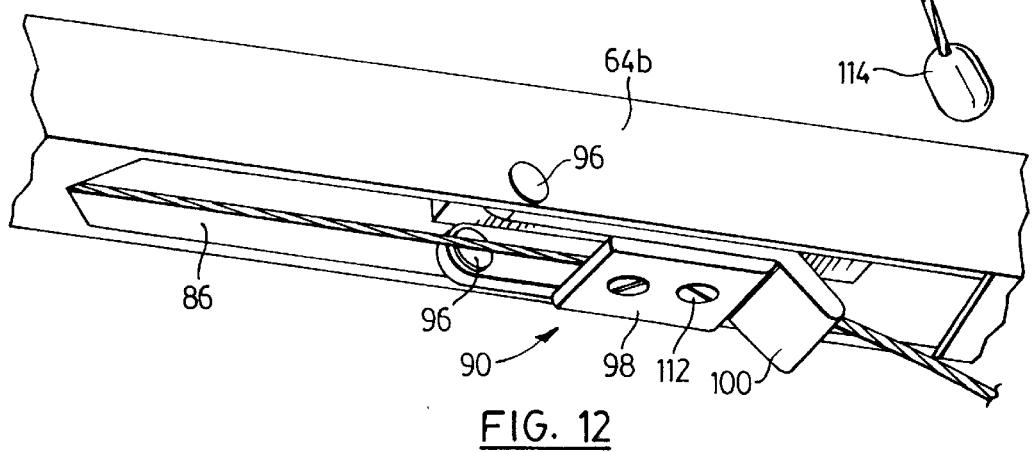
FIG. 12 is a perspective view taken from below of the portion of FIG. 11 in a locked condition.

The buckles 92 are pivotal about the pivot pins 96 between downwardly extending unlocked positions (see FIG. 11) and locked positions where the buckles 92 are accommodated by the cutouts 86 in the rib 64b (see FIG. 12). Stops 102 within the rib 64b limit pivotal movement of the buckles. A steel cable 110 runs along each side of the bed cover assembly beneath the sheet 60 and passes through each of the ribs 64 as well as through rib 64a. Each cable 110 is secured at one end to the rib 64a by way of a stopper (not shown) on the end of the steel cable 110. Each cable 110 is adjustably secured near its other end to the bridge 98 of one of the buckles 92 by way of set screws 112. A ball 114 is attached to the end of each cable 110 to facilitate pulling on the cable to pivot the buckle to the unlocked position. A protective sheath 116 surrounds and guides each cable 110 within the rib 64b to provide a generally even turn as the cable turns through approximately 90 degrees.

In use, when it is desired to secure the bed 14, the cover 24 is rolled along or placed on the tracks 22 from above to cover the bed 14 so that the blocks 40 are positioned between the last two ribs 64 at each end of the cover 24 with the retaining pins 44 on the blocks 40 being aligned with the holes 82 in the ribs 64a and 64b. While the cover 24 is being unrolled, the tailgate 16 can be in either an open or closed position. Once the cover 24 is positioned on the tracks 22 and covers the vehicle bed, the tailgate 16 must be in an open position in order to lock the bed cover assembly 20. To achieve this, the buckles 92 are pivoted from the unlocked positions to the locked positions. As this occurs, the steel cables 110 are placed in tension causing the ribs 64a and 64b to move towards one another. This in turn causes the end ribs 64a and 64b to abut the blocks 40 with the retaining pins 44 and the holes 82 moving into mating engagement. With the retaining pins 44 and holes 82 in mating engagement, lifting of the cover 24 from the tracks 22 and sliding of the cover along the tracks 22 is inhibited. The camber of the tracks 22 inhibits rattling of the cover and inhibits lifting of the sheet 60 making it difficult to peer into the bed 14 when the cover 24 is locked into position on the tracks. At this stage, the tailgate 16 can be closed to conceal the buckles 92 within the bed 14. If further security is desired, an additional locking mechanism can be provided to lock the handle of the tailgate 16.

To release the cover 24, the tailgate 16 needs to be opened and the buckles 92 pivoted to the unlocked positions by applying downward pressure to the buckles 92 by pulling on the balls 114 at the free ends of the cables 110. With the buckles 92 in the unlocked position, the tension on the cables 110 is released allowing the ribs 64a and 64b to be pulled away from the blocks 40 to remove the retaining pins 44 from the holes 82 in the ribs 64a and 64b respectively. The cover 24 can then be folded back over itself from either end, lifted completely from the tracks 22 or rolled up along the tracks from either end to allow the bed 14 to be accessed. The friction strips 70 on the cover 24 facilitate rolling of the cover 24 by keeping the cover in a tight roll. The thickness of the friction strips 70 is selected to inhibit the ribs 64 and/or rivets 72 from contacting one another as the cover is rolled.

Figure 13:
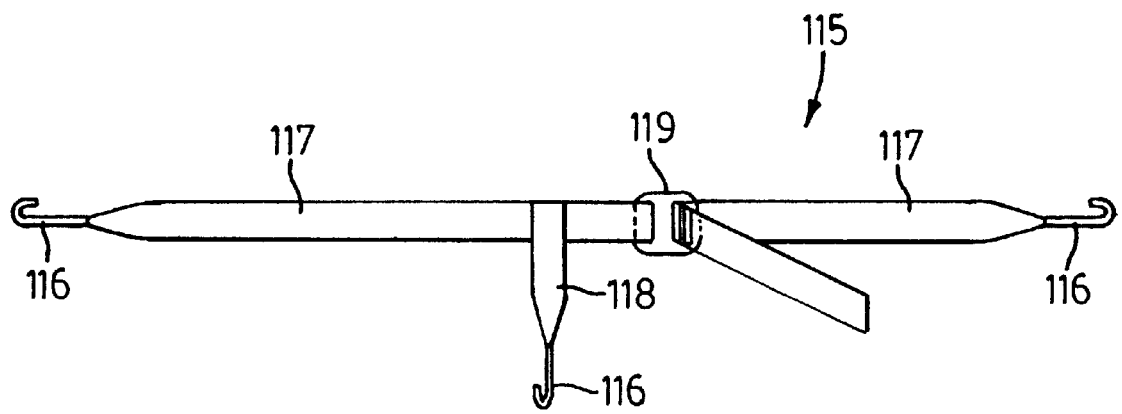
FIG. 13 is a top plan view of a strap used to maintain the bed cover assembly of FIG. 1 in a rolled condition.

If desired, the cover 24 can be secured to the tracks 22 in a rolled condition to expose part or all of the vehicle bed 14. In this case, T-shaped tie-down straps 115, one of which is shown in FIG. 13, can be used to secure the cover 24 in a rolled condition on the tracks 22. Each T-shaped strap 115 includes hooks 116 at the ends of its arms 117 and at the end of its stem 118. A tension adjuster 119 acts between the arms 117 to allow their relative lengths to be adjusted.

Figure 14:
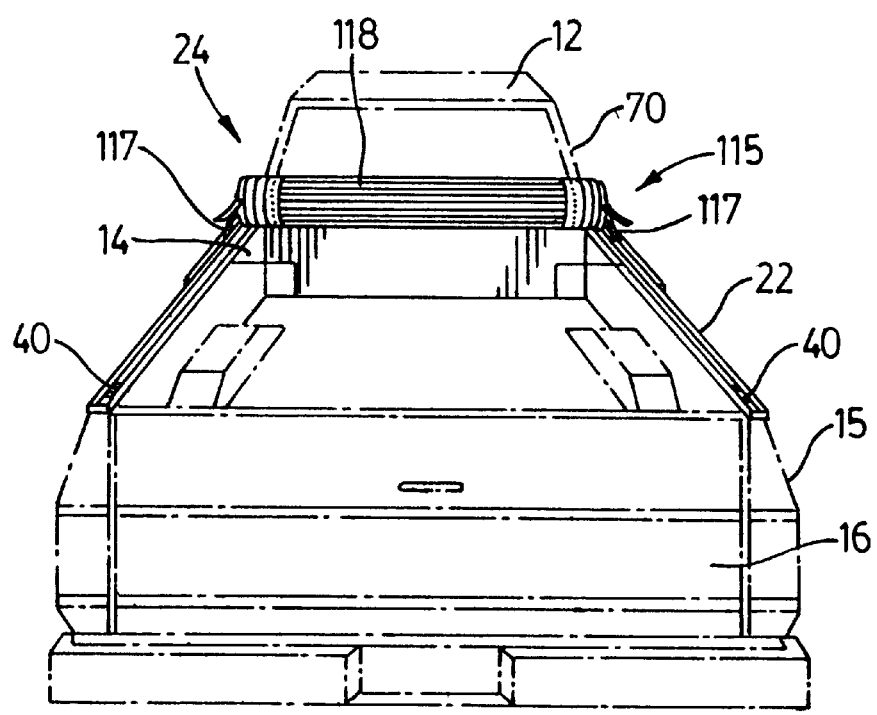
FIG. 14 is a rear perspective view of the vehicle of FIG. 1 with the bed cover assembly in a rolled condition.

When the cover 24 is in a rolled state as shown in FIG. 14, each strap 115 is attached to the cover 24 and to a respective one of the tracks 22. Specifically, the hooks 116 on the arms 117 of each strap 115 are inserted into holes (not shown) formed in the upright surfaces 32d of the L-shaped members 32 on opposite sides of the rolled cover so that the arms 117 overlie the rolled cover. The hook 116 on the stem 118 is then inserted into a hole (not shown) in the supporting rib 64 on the top of the roll to inhibit the arms 117 from sliding off the end of the rolled cover. Once this has been done, the tension adjuster 119 is used to tighten the arms around the rolled cover to maintain the cover in position on the tracks 22.

Installing the bed cover assembly 20 on the vehicle 10 is a relatively simple task. It is only necessary to place the tracks 22 on the top surfaces of the sidewalls 15 and secure the tracks thereto via the clamps 50. Once this has been done, the bed cover assembly 20 is ready for use.

Although the ribs 64a and 64b and blocks 40 have been described as carrying cooperating holes 82 and retaining pins 44 respectively, it should be apparent to those of skill in the art, that the ribs can carry the retaining pins and the blocks can be provided with holes to accommodate the retaining pins. In addition, different cooperating formations can be provided on the ribs and blocks such as for example, complimentary inclined faces. The configuration of the cooperating formations simply needs to be selected to inhibit lifting of the cover 24 from the tracks 22 and sliding of the cover along the tracks when the cooperating formations are brought into mating engagement and the cover is under tension.

In addition, although each track 22 is shown having a block 40 adjacent its opposite ends, additional blocks can be provided at spaced locations intermediate the length of each track 22. In this case, the ribs 64 adjacent these additional blocks will also carry formations for cooperation with the formations carried by the additional blocks so that the formations engage when the cover 24 is placed under tension. If additional blocks are provided along the lengths of the tracks 22, stoppers are provided on the cables 110 within the ribs 64 carrying the formations so that the ribs are brought into abutment with the blocks with the complimentary formations in mating engagement when the cover is placed under tension. Providing a sufficient number of additional blocks along the lengths of the tracks 22 obviates the need for the camber of the base members 30 and allows a portion of the cover to be rolled and held in place by the straps with the remaining part of the cover being kept under tension.

With respect to the steel cables 110, those of skill in the art will appreciate that other suitably strong material may be used. Also, although two cables are shown running along each side of the cover 24, those of skill in the art will appreciate that alternative arrangements are possible. For example, a single continuous cable may be used. The steel cable in one arrangement runs through rib 64a and along opposed sides of the cover 24. Each end of the cable is attached to a respective buckle. Alternatively, the cable can have one end fixed to the rib 64b by way of a stopper on the end of the cable. The cable in this case runs along one side of the cover, through the rib 64a and back along the opposite side of the cover. The other end of the cable in this case is secured to a buckle. As will be appreciated, only one buckle is required in this arrangement.

Figure 15:
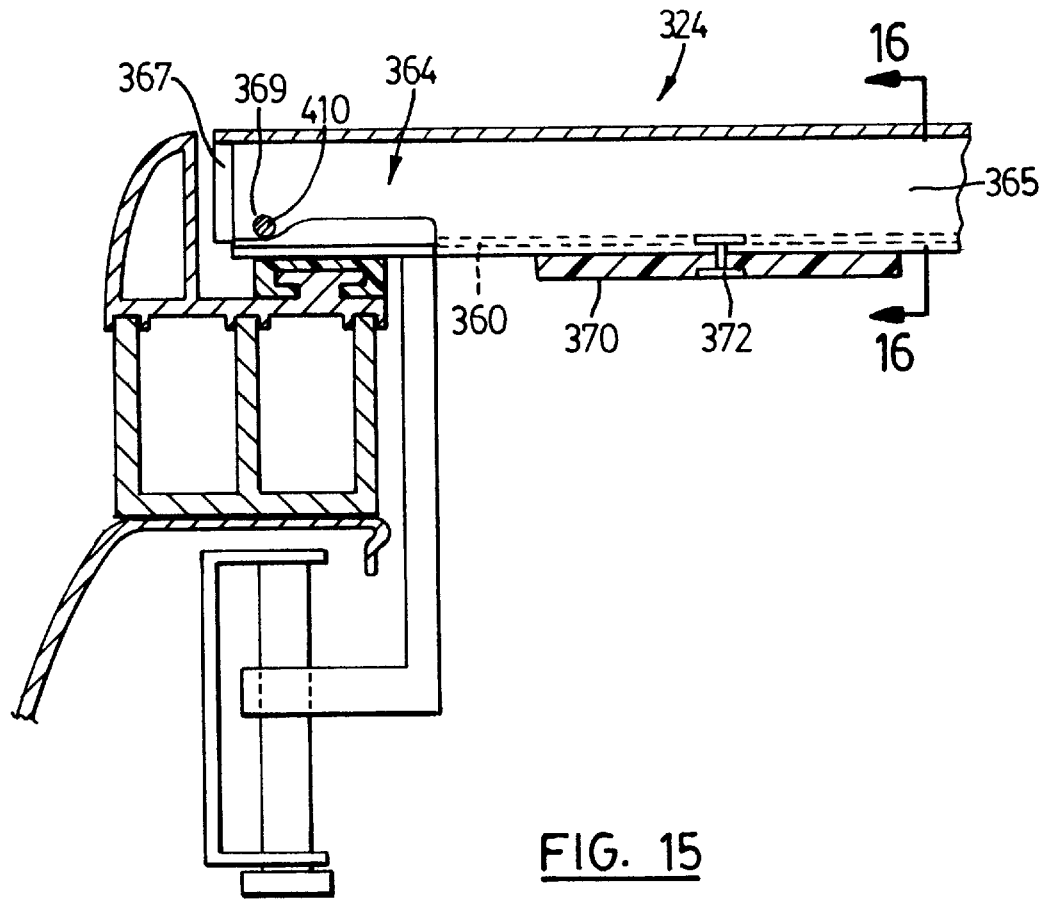
FIG. 15 is a cross-sectional view of a portion of an alternative embodiment of a cover for a bed cover assembly in accordance with the present invention.
Figure 16:
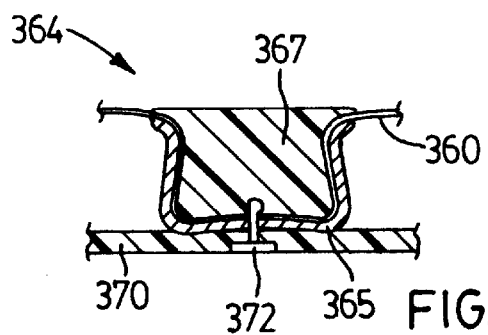
FIG. 16 is a cross-sectional view of the cover of FIG. 15 taken along line 16—16.
Figure 17:
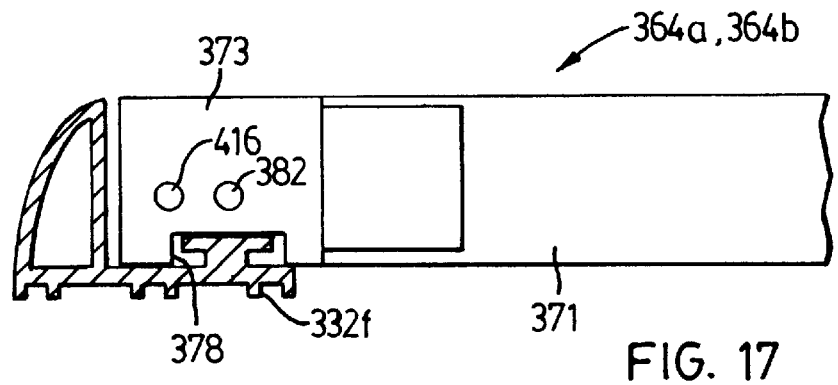
FIG. 17 is a cross-sectional view of another portion of the cover of FIG. 15.
Figure 18:
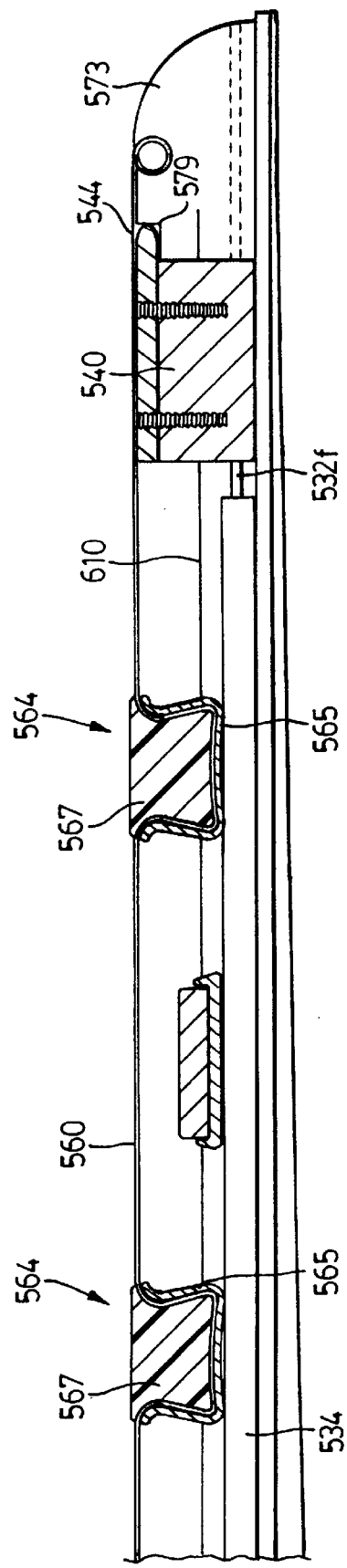
FIG. 18 is a cross-sectional view of a portion of another embodiment of a bed cover assembly in accordance with the present invention.
Figure 19:
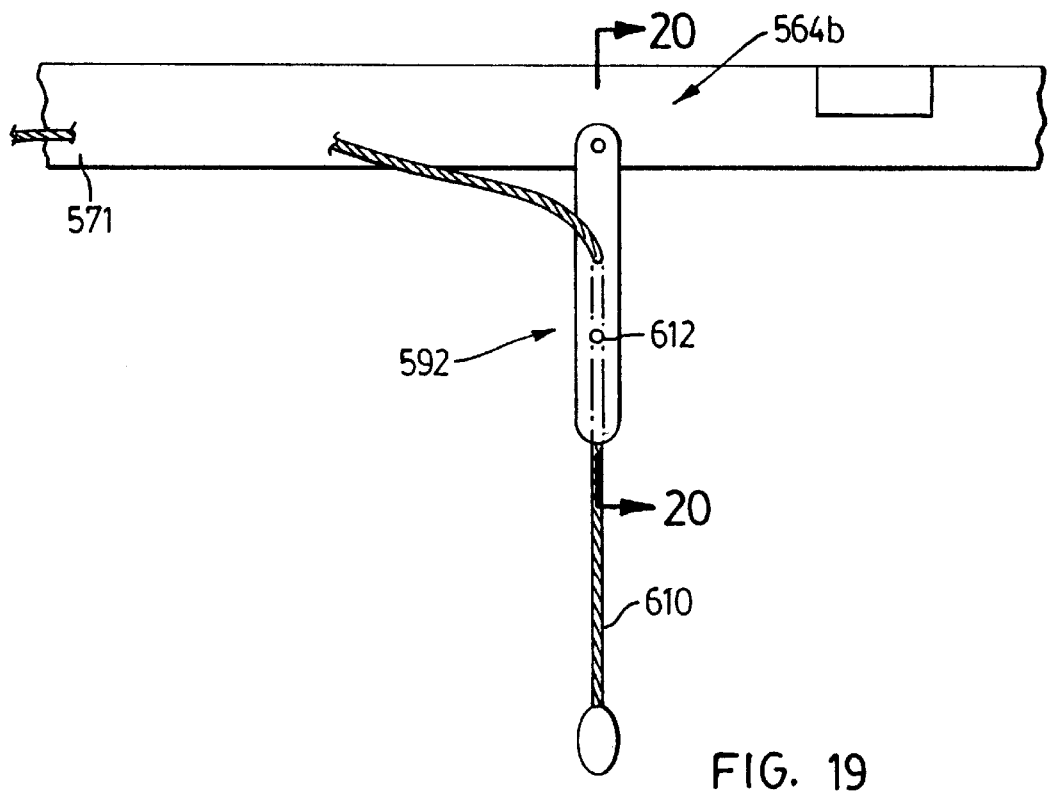
FIG. 19 is an elevational view of a portion of an end rib forming part of the bed cover assembly of FIG. 18.

Referring now to FIGS. 15 to 17, another embodiment of a bed cover assembly is shown. In this embodiment, like reference numerals will be used to indicate like components with a "300" added for clarity. The cover 324 in this embodiment is more aesthetic than that of the previous embodiment since the upper surface of the cover is free from rivets. The upper surfaces of the transverse supporting ribs 364 are however visible.

In this embodiment, each supporting rib 364 excluding the end ribs is constituted by a two-part assembly including a generally U-shaped metal or plastic channel 365 and a generally rectangular plastic piece 367 accommodated by the channel. The U-shaped channels 365 and the plastic pieces 367 snap-fit together trapping the sheet 360 therebetween to secure the supporting ribs 364 to the sheet. The plastic pieces 367 extend beyond the ends of the channels 365. Holes 369 are provided through the channels and plastic pieces at opposed ends of each supporting rib to allow the cables 410 to pass through the ribs. The rivets 372 which attach the friction strips 370 to the undersurfaces of the ribs 364 also pass through the sheet 360 and the plastic pieces 367 to secure further the sheet 360 to the supporting ribs 364 and to inhibit separation of the channels 365 and the plastic pieces 367.

Figure 10:
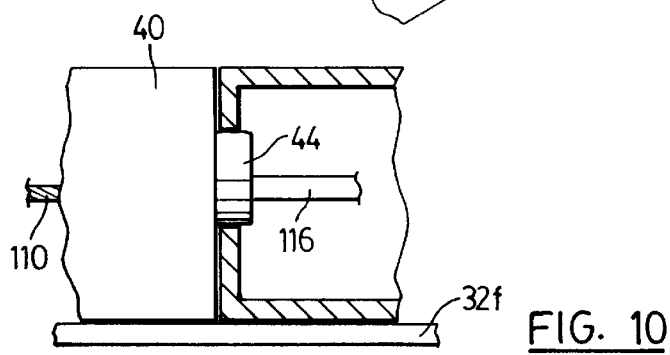
FIG. 10 is a cross-sectional view of FIG. 9 taken along line 10—10.
Figure 11:
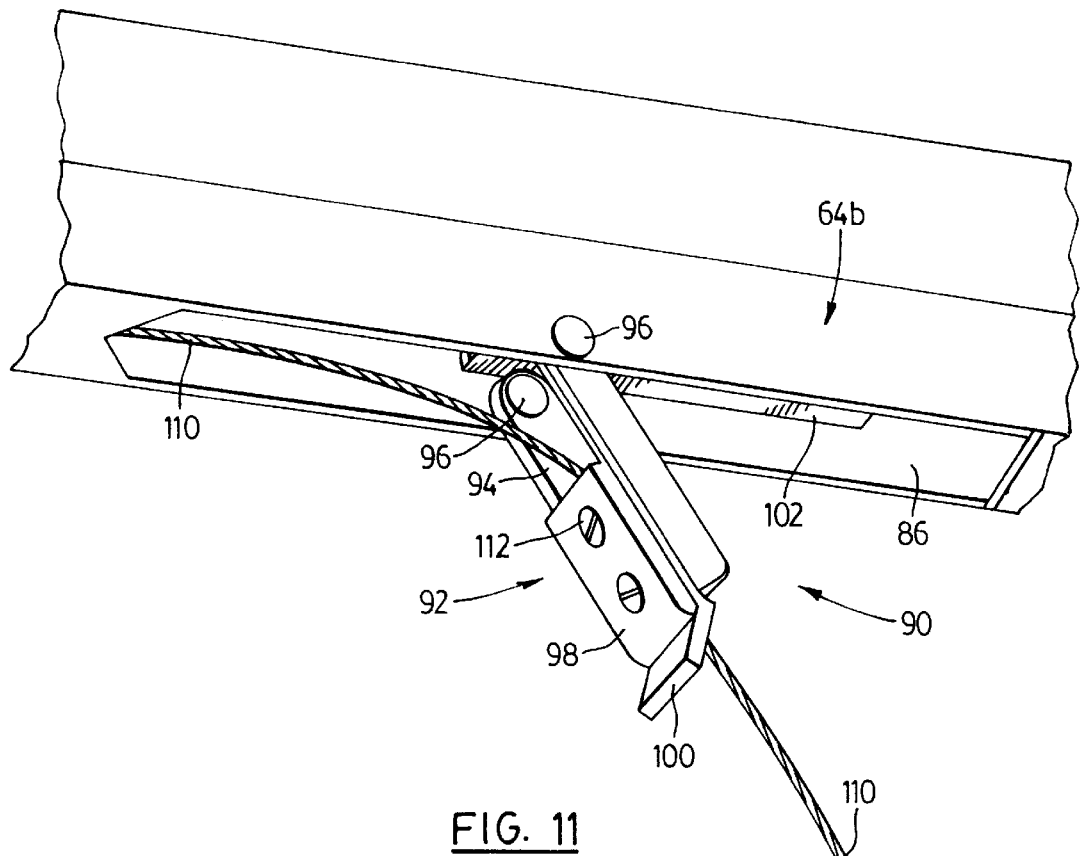
FIG. 11 is a perspective view taken from below and in the direction of arrow 11 of another portion of the bed cover assembly of FIG. 1 in an unlocked condition.

The end ribs 364a and 364b are different from the other ribs 364 and include generally hollow rectangular members 371 similar to that shown in FIG. 10. End caps 373 are pressed into the open ends of the members 371. Each end cap has a rectangular cut-out 378 provided in its bottom surface to accommodate the rail 332f. The end caps accommodate the protective sheaths 416 so that the cables are properly protected and guided as the cables make 90 degree turns within the end caps. Each end cap 373 includes a hole 382 to cooperate with the retaining pin on a block.

Referring now to FIGS. 18 to 24 still yet another embodiment of a bed cover assembly for a vehicle bed is shown. In this embodiment, like reference numerals will be used to indicate like components of the first embodiment with a "500" added for clarity. Similar to the previous embodiment, the transverse supporting ribs 564 excluding the end ribs, only end rib 564b of which is shown, are constituted by two-part assemblies including U-shaped channels 565 and generally rectangular plastic pieces 567 accommodated by the channels.

Each end rib includes a rectangular member 571 having caps 573 pressed into its open ends. An extruded recess 575 in the upper surface of each end rib extends the length of each end rib and accommodates the end of the sheet 560 which surrounds a rope or cylinder 577. A notch 579 is formed in the upper surface of each end cap 573 and extends along its inside edge. The end caps 573 accommodate protective sheaths 616 so that the cables 610 are properly protected and guided as the cables make 90 degree turns within the end caps. The cables 610 pass through the supporting ribs 564 near their bottom surfaces.

The blocks 540 on the rails have projecting lips 544 which are accommodated by the notches 579 in the end caps 573 when the cover 524 overlies the vehicle bed.

Figure 20:
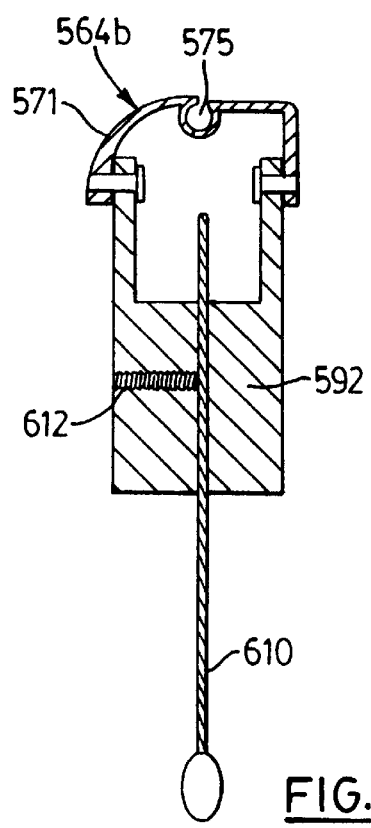
FIG. 20 is a cross sectional view of a buckle forming part of the bed cover assembly of FIG. 19 taken along line 20—20.
Figure 21:
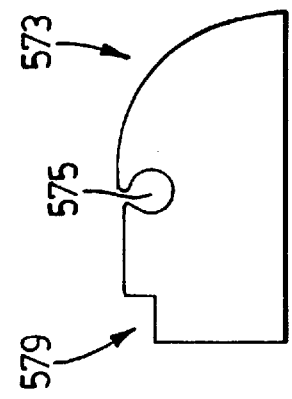
FIGS. 21 and 22 are front and side elevational views respectively of another portion of the end rib of FIG. 19.
Figure 22:
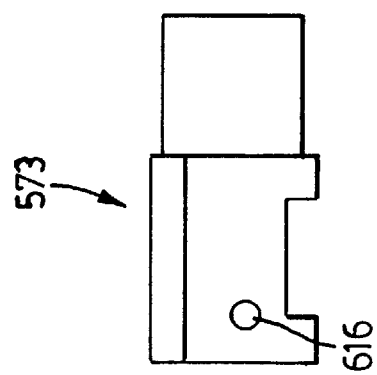

In this embodiment, the buckles 592 do not include downwardly extending tabs. A single set screw 612 extends through the bridge of each buckle 592 to secure the cables 610 to the buckles 592 as shown in FIG. 20.

During installation of the bed cover assembly 520, the cover is unrolled over the tracks 522 until the end ribs are positioned on the outside of the blocks 540. The end ribs are then oriented so that the lips 544 on the blocks 540 extend into the corners of the notches 579 in the end caps 573 defining pivot points for the end ribs. The end ribs are then pivoted downwardly about the pivot points in the direction of arrow 591 (see FIGS. 23 and 24) until the bottom surfaces of the end caps 573 are flush with the tracks 522. At this time, the buckles 592 are pivoted to the locked condition to place the cables 610 under tension to secure the end ribs in position with the cover under tension. The vertical spacing between the sheet 560 and the cables 610 assists to inhibit the end ribs from being pivoted back upwardly when the cables 610 are under tension. The mating engagement of the lips 544 and notches 579 inhibits lifting of the cover from the tracks. As will be appreciated, the position of the blocks 540 along the rails 532f will determine the amount of tension placed on the sheet 560 when the end ribs are pivoted downwardly. The tension placed on the sheet 560 inhibits the sheet from flapping due to wind and gives the sheet a sleek look.

Figure 25:
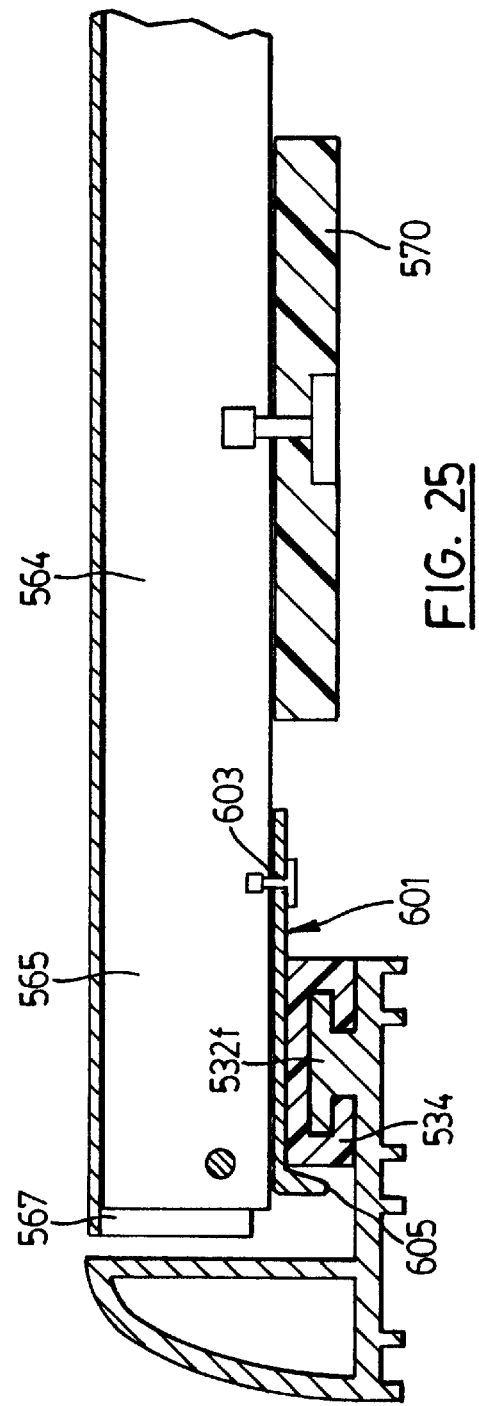
FIG. 25 is a cross-sectional view of a portion of yet another embodiment of a bed cover assembly in accordance with the present invention.
Figure 23:
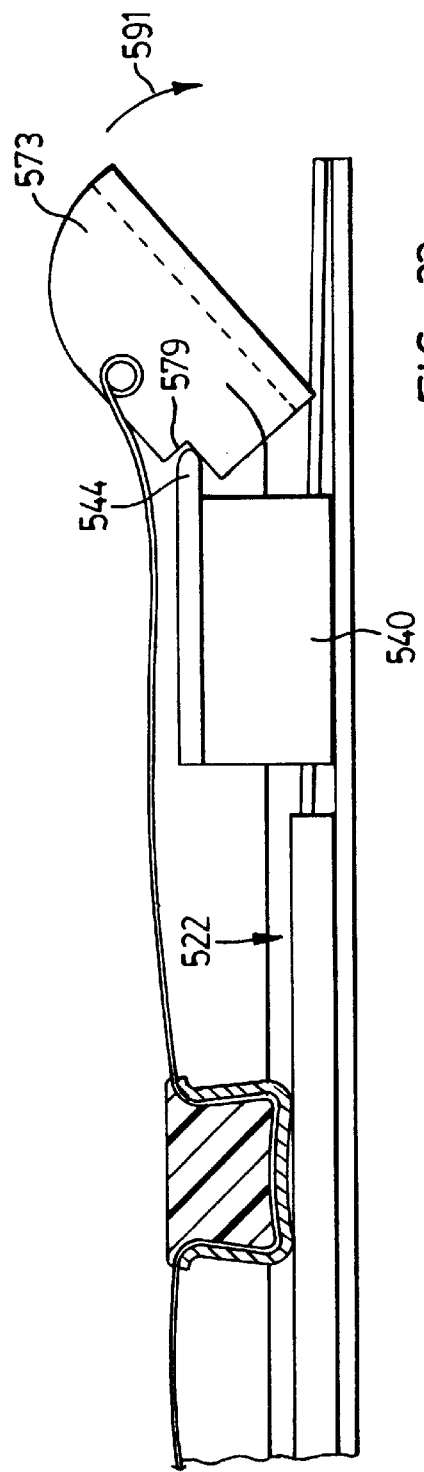
FIGS. 23 and 24 are cross-sectional views similar to that of FIG. 18 showing the cover engaging the tracks.
Figure 24:
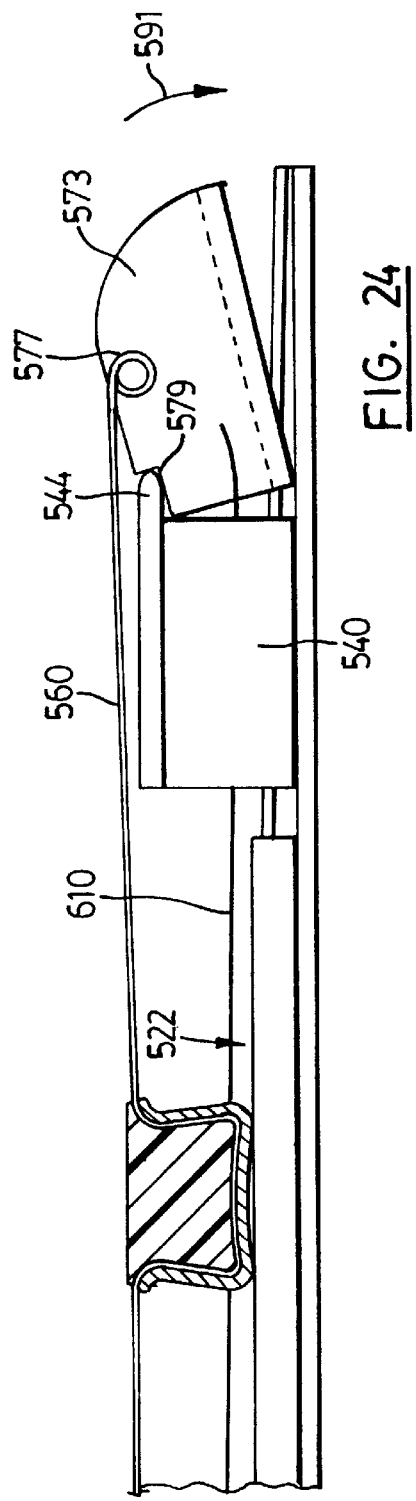

If additional support is desired for the ribs 564, flanges 601 can be secured to the ends of the ribs 564 by way of rivets 603. As can be seen in FIG. 25, each flange includes a depending lip 605 to abut against the interior side of the cushion 534 on the rail 532f. The flanges 601 help to reduce flexing of the ribs 564 when the ribs are placed under a load. If the flanges 601 are used, the thickness of the friction strips 570 is increased to inhibit the flanges on adjacent ribs from contacting one another as the cover 524 is rolled.

Figure 26:
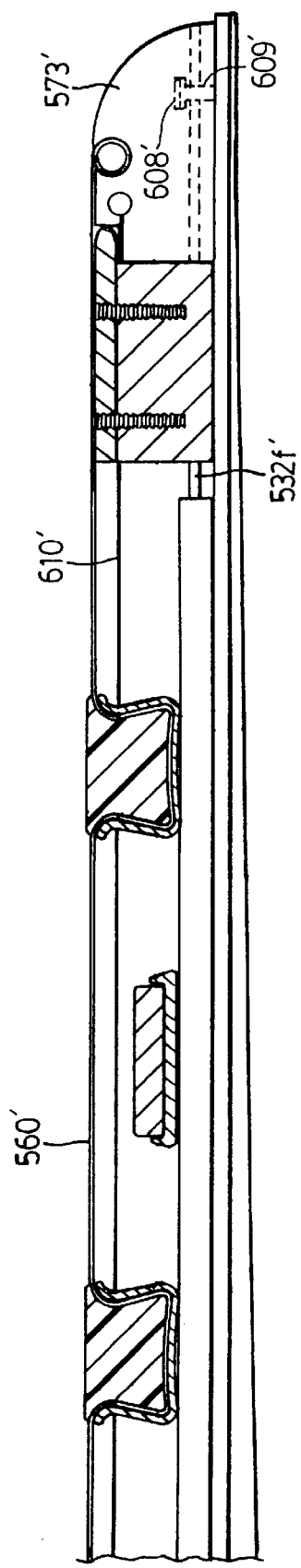
FIG. 26 is a cross-sectional view of an end rib forming part of yet another embodiment of a bed cover assembly in accordance with the present invention.

If desired, the buckles can be replaced with an alternative locking mechanism as illustrated in FIG. 26. As can be seen, in this embodiment, the cables 610' are closer to the sheet 560'. The ends of the cables 610' are terminated in the end caps 573' by way of adjustable stoppers 607'. The adjustable stoppers 607' allow the effective lengths of the cables to be adjusted to ensure the sheet is taught when the cables are under tension. The cables 610' in the case pass through the supporting ribs slightly below the sheet 560' and are slightly below the projecting lips on the blocks. A hole 608' is provided in the bottom surface of each end cap and is sized to accommodate a co-operating projection 609' adjacent the end of the track 532f in a snap-fit relationship. Thus, when the end ribs are pivoted downwardly to place the cables 610' under tension and bring the bottom surfaces of the end caps 573' flush with the tracks 532f', the projections 609' snap-fit into the holes 608' to secure the position of the end ribs with the cover under tension. As will be appreciated, in this embodiment, the cables 610' can be omitted.

Referring now to FIG. 27 still yet another embodiment of a bed cover assembly for a vehicle bed is shown and is generally indicated to by reference numeral 720. In this embodiment, like reference numerals will be used to indicate like components of the first embodiment with a "700" added for clarity. The tracks 722 include cambered base members 730 similar to those shown in the first embodiment. On top of each base member is a top member 732 having a planar base 732a, an upright interior sidewall 732b and a curved upper surface 732c bridging the top of the upright sidewall and the exterior edge of the base. Pairs of longitudinally extending ribs 732d depend from the base and form a snap-fit with the upright walls 730c of the base members.

Overlying the tracks 722 is a sheet 760 which unlike the previous embodiment, only includes end ribs at opposite ends of the sheet 760. The end ribs in this embodiment abut against the ends of the tracks 722. The end ribs and the ends of the tracks present cooperating faces (not shown) which move into mating engagement to inhibit lifting of the cover when the cover is placed under tension. The cables 810 which extend between the end ribs are housed within protective sheaths 810a and are surrounded by the sheet 760 at its peripheral side edges The cables are secured to the end rib adjacent the cab by stoppers and are secured to buckles on the end rib adjacent the tailgate as previously described.

In use, the cover 724 is placed over the tracks 722 with the sheet 760 overlying the top members 732 and the cables running alongside the base members 730. The curved upper surfaces of the top members 732 give the sheet 760 an arched orientation to facilitate draining of water and to maintain the aesthetic appeal of the cover. Once the cover is positioned over the tracks with the end ribs abutting the ends of the tracks 722, the buckles are pivoted to the closed position to place the cables 810 under tension and inhibiting lifting of the end ribs. When the cables 810 are placed in tension, vertical downward forces are placed on the sides of the sheet. The downward forces are transmitted to the sheet 760 in a horizontal, crosswise fashion giving the bed cover assembly 710 an appealing look due to the fact that the horizontal, crosswise forces are uniform along the longitudinal axis of the sheet 760.

As should be appreciated, the cover of the bed cover assembly is brought into a locked condition by placing the cover under tension. In the embodiments described above, this is achieved by maintaining the abutments on the tracks stationary and tightening the cables to bring the ribs of the cover into abutment with the tracks. It should however be appreciated by those of skill in the art that the blocks on the tracks can be moved towards the ends of the tracks by way of levers to bring the blocks into abutment with the end ribs with the formations in mating engagement and thereby place the cover under tension.

Although the tracks have been described as being attached to the sidewalls 15 of the vehicle bed via clamps, other forms of attachment can be used. For example, double-sided tape or bolts can be used to secure the tracks to the sidewalls.

Those of skill in the art will appreciate that the present invention provides an inexpensive bed cover assembly for a vehicle bed which can be installed quickly and easily and which provides security for the contents within the vehicle bed. When released, the bed cover assembly allows the vehicle bed to be accessed from either end simply by rolling or folding the cover. The cambered tracks inhibit the cover from rattling and provide sleek lines along the tops of the vehicle bed sidewalls to maintain the aesthetic appearance of the vehicle.

Although preferred embodiments of the present invention have been described those of skill in the art will appreciate that other modifications and variations may be made to the present invention without departing from the spirit and scope thereof as defined by the appended claims.

I claim:

1. A bed cover assembly for a vehicle bed comprising:
   a pair of tracks to be secured to opposed sidewalls of the vehicle bed;
   a flexible cover extendible between said tracks to cover said vehicle bed, said cover including a flexible sheet and transverse supporting end ribs secured to said sheet at opposite ends thereof;
   first abutment members adjacent opposite ends of each track, said first abutment members and said end ribs having cooperating formations thereon, said first abutment members and said end ribs moving into abutment with said cooperating formations in mating engagement when said cover is longitudinally in tension and extends between said tracks to cover said vehicle bed thereby to inhibit lifting of said cover from said tracks; and a releasable locking mechanism to maintain said cover in tension and inhibit separation of said cooperating formations.

2. A bed cover assembly as defined in claim 1 wherein said first abutment members are on said tracks and are adjustably mounted thereon.

3. A bed cover assembly as defined in claim 1 wherein said first abutment members are constituted by blocks adjacent said opposite ends of each track.

4. A bed cover assembly as defined in claim 1 wherein said cover further includes a plurality of transverse intermediate supporting ribs secured to said sheet at spaced locations between said end ribs to provide rigidity to said cover along a longitudinal axis thereof.

5. A bed cover assembly as defined in claim 4 wherein said cover further includes a cable length running longitudinally along each side of said cover beneath said sheet, each cable length passing through said end ribs and being placeable in tension to bring said end ribs into abutment with said first abutment members with said cooperating formations in mating engagement.

6. A bed cover assembly as defined in claim 5 wherein said cooperating formations are constituted by projecting lips and complimentary notches, said sheet being placed in tension upon pivoting of said end ribs about said first abutment members to bring said lips and said notches into mating engagement.

7. A bed cover assembly as defined in claim 6 wherein said first abutment members carry said lips, said end ribs having said notches therein to accommodate said lips.

8. A bed cover assembly as defined in claim 7 wherein said cover includes a pair of cables, each of said cables running longitudinally along a respective one of said sides of said cover beneath said sheet, and wherein said locking mechanism includes a buckle associated with each cable, each said buckle being pivotally connected to one of said end ribs and being moveable between unlocked and locked conditions, each cable being attached at one end to a respective said buckle and at an opposite end to another of said end ribs, each-cable being placed in tension upon pivoting of said respective buckle to said locked condition.

9. A bed cover assembly as defined in claim 7 wherein said cover includes a pair of cables, each of said cables running longitudinally along a respective one of said sides of said cover beneath said sheet, opposite ends of each cable being attached to a respective one of said end ribs, said locking mechanism being constituted by releasable snap-fit fasteners on said end ribs and said tracks, said releasable fasteners moving into mating engagement when said end ribs are pivoted downwardly about said first abutment members.

10. A bed cover assembly as defined in claim 4 wherein each of said tracks has a camber.

11. A bed cover assembly as defined in claim 10 further including a plurality of releasable clamps to secure releasably said tracks to the sidewalls of said vehicle bed.

12. A bed cover assembly as defined in claim 11 wherein said clamps have wedged-shaped surfaces contacting said tracks to compensate for the camber of said tracks and thereby maintain said clamps generally upright.

13. A bed cover assembly as defined in claim 4 wherein said cover further includes at least two laterally spaced, longitudinally extending friction strips, said friction strips being connected to said intermediate supporting ribs beneath said sheet to facilitate rolling of said cover.

14. A bed cover assembly as defined in claim 13 further including tie-down straps to engage said tracks and said cover when said cover is in a rolled condition thereby to maintain said cover in said rolled condition on said tracks.

15. A bed cover assembly as defined in claim 14 wherein each of said tie-down straps is generally T-shaped and includes a pair of adjustable arms and a stem, said arms and said stem having hooks at free ends thereof for engaging a respective track and intermediate rib.

16. A bed cover assembly as defined in claim 13 wherein each of said tracks includes a generally L-shaped member having a base and an upright wall on said base, said base having a longitudinally extending rail thereon spaced from said upright wall, said rail and said upright wall defining a gutter for water passing between said sheet and said upright wall.

17. A bed cover assembly as defined in claim 16 wherein said intermediate supporting ribs are generally in a form of rectangular parallelepipeds, said sheet being secured to an upper surface of said supporting ribs by fasteners.

18. A bed cover assembly as defined in claim 16 wherein said intermediate supporting ribs are constituted by U-shaped channels accommodating generally rectangular members, said sheet being trapped between said channels and said rectangular members.

19. A bed cover assembly as defined in claim 18 wherein said friction strips are secured to said intermediate supporting ribs by fasteners, said fasteners passing through said channels, said sheet, and said rectangular members to inhibit separation of said channels and said rectangular members.

20. A bed cover assembly as defined in claim 19 further including supporting flanges secured to opposite ends of each of said intermediate supporting ribs, said supporting flanges having depending lips thereon to engage said rails.

21. In combination:

a vehicle having a bed onto which articles may be placed, said bed having a pair of opposed sidewalls; and a bed cover assembly for said bed, said bed cover assembly including a pair of tracks, each of said tracks being secured to a respective said sidewall of said bed; a flexible cover extendible between said tracks to cover said vehicle bed, said cover including a flexible sheet and transverse supporting end ribs secured to said sheet at opposite ends thereof, first abutment members adjacent opposite ends of each track, said first abutment members and said end ribs having cooperating formations thereon, said first abutment members and said end ribs moving into abutment with said cooperating formations in mating engagement when said cover is longitudinally in tension and extends between said tracks to cover said vehicle bed thereby to inhibit lifting of said cover from said tracks; and a releasable locking mechanism to maintain said cover in tension and inhibit separation of said cooperating formations.

22. A bed cover assembly for a vehicle bed comprising:

a pair of tracks to be secured to opposed sidewalls of the vehicle bed, each track having a camber;

a cover extendible between said tracks to cover said vehicle bed;

first abutment members adjacent opposite ends of each track and second abutment members on said cover, said first and second abutment members having cooperating formations thereon, said first and second abutment members moving into abutment with said cooperating formations in mating engagement when said cover is in tension and extends between said tracks to cover said vehicle bed thereby to inhibit lifting of said cover from said tracks; and a releasable locking mechanism to maintain said cover in tension and inhibit separation of said cooperating formations;

wherein said cover includes a flexible sheet, transverse supporting end ribs constituting said second abutment, said end ribs being members secured to said sheet at opposite ends thereof, and a plurality of transverse intermediate supporting ribs secured to said sheet at spaced locations between said end ribs.

23. A bed cover assembly as defined in claim 22 further including a plurality of releasable clamps to secure releasably said tracks to the sidewalls of said vehicle bed.

24. A bed cover assembly as defined in claim 22 wherein said clamps have wedge-shaped surfaces contacting said tracks to compensate for the camber of said tracks thereby to maintain said clamps generally upright.

25. A bed cover assembly as defined in claim 22 wherein said cover further includes a cable running longitudinally along each side of said cover beneath said sheet, each cable passing at least through said end ribs, said locking mechanism acting on each cable to place each cable in tension to bring said end ribs into abutment with said first abutment members.

26. A bed cover assembly as defined in claim 25 wherein said locking mechanism includes a buckle associated with each cable, each said buckle being pivotally connected to one of said end ribs and moveable between unlocked and locked conditions, each cable being attached at one end to a respective said buckle and at an opposite end to another of said end ribs, each cable being placed in tension upon pivoting of said respective buckle to said locked condition.

27. A bed cover assembly as defined in claim 26 wherein each said buckle is acconmmodated within said one end rib when said buckle is in said locked condition.

28. A bed cover assembly for a vehicle bed comprising:

a pair of tracks to be secured to opposed sidewalls of the vehicle bed;

a cover extendible between said tracks to cover said vehicle bed;

first abutment members adjacent opposite ends of each track and second abutment members on said cover, said first and second abutment members having cooperating formations thereon, said first and second abutment members moving into abutment with said cooperating formations in mating engagement when said cover is in tension and extends between said tracks to cover said vehicle bed thereby to inhibit lifting of said cover from said tracks; and a releasable locking mechanism to maintain said cover in tension and inhibit separation of said cooperating formations;

wherein said cover includes a flexible sheet, transverse supporting end ribs constituting said second abutment members secured to said sheet at opposite ends thereof, a plurality of intermediate supporting ribs secured to said sheet at spaced locations between said end ribs, and a cable running longitudinally along each side of said cover beneath said sheet, each said cable at least passing through said end ribs and being placeable in tension to bring said end ribs into abutment with said first abutment members with said cooperating formations in mating engagement, said cooperating formations being constituted by projecting lips and complementary notches on said end ribs and said first abutment members, said sheet being placed in tension upon pivoting of said end ribs downwardly about said first abutment members to bring said lips and said notches into mating engagement.

29. A bed cover assembly as defined in claim 28 wherein said first abutment members carry said lips, said end ribs having said notches therein to accommodate said lips.

30. A bed cover assembly as defined in claim 28 wherein said locking mechanism includes a buckle associated with each cable, each said buckle being pivotally connected to one of said end ribs and moveable between unlocked and locked conditions, each cable being attached at one end to a respective said buckle and at an opposite end to another of said end ribs, each cable being placed in tension upon pivoting of said respective buckle to said locked condition.

31. A bed cover assembly as defined in claim 29 wherein opposite ends of each cable are attached to a respective one of said end ribs, said locking mechanism being constituted by releasable snap-fit fasteners on said end ribs and said tracks, said releasable fasteners moving into mating engagement when said and ribs are pivoted downwardly about said first abutment members.

32. A bed cover assembly for a vehicle bed comprising:

a pair of tracks to be secured to opposed sidewalls of the vehicle bed;

a flexible cover extendible between said tracks to overlie and cover said vehicle bed;

first abutment members adjacent opposite ends of each track and second abutment members on said cover, said first and second abutment members having cooperating formations thereon, said first and second abutment members moving into abutment with said cooperating formations in mating engagement when said cover is in tension and extends between said tracks to overlie and cover said vehicle bed thereby to inhibit lifting of said cover from said track; and a releasable locking mechanism to maintain said cover in tension and inhibit separation of said cooperating formations;

wherein each of said tracks includes a generally L-shaped member having a base and an upright wall on said base, said base having a longitudinally extending rail thereon spaced from said upright wall, said rail and said upright wall defining a gutter for water passing between said cover and said upright wall.

33. A bed cover assembly as defined in claim 32 wherein said cover includes a flexible sheet and transverse supporting end ribs secured to said sheet at opposite ends thereof, said end ribs constituting said second abutment members.

34. A bed cover assembly as defined in claim 33 wherein said cover further includes a plurality of transverse intermediate supporting ribs secured to said sheet at spaced locations between said end ribs.

35. A bed cover assembly as defined in claim 34 wherein said intermediate supporting ribs are generally in a form of rectangular parallelpipeds, said sheet being secured to an upper surface of said intermediate supporting ribs by fasteners.

36. A bed cover assembly as defined in claim 34 wherein said intermediate supporting ribs are constituted by U-shaped channels accommodating generally rectangular members, said sheet being trapped between said channels and said rectangular members.

37. A bed cover assembly as defined in claim 36 further comprising friction strips secured to said intermediate supporting ribs by fasteners, said fasteners passing through said channels, said sheet, and said rectangular members to inhibit separation of said channels and said rectangular members, said friction strips being laterally spaced and facilitating rolling of said cover.

38. A bed cover assembly as defined in claim 37 further including supporting flanges secured to opposite ends of each of said intermediate supporting ribs, said supporting flanges having depending lips thereon to engage said rails.

39. A bed cover aseembly as defined in claim 37 further including tie-down straps to engage said tracks and said cover when said cover is in a rolled condition thereby to maintain said cover on said tracks in said rolled condition.

40. A bed cover assembly as defined in claim 39 wherein each of said tie-down straps is generally T-shaped and includes a pair of adjustable arms and a stem, said arms and said stem having hooks at free ends thereof, the hooks on said arms being accommodated by holes in a respective said track on opposite sides of said cover when said cover is in said rolled condition so that said arms overlie said cover, the hook on said stem being accommodated by a hole in one said intermediate supporting rib.

41. A bed cover assembly as defined in claim 34 wherein said cover further includes a cable running longitudinally along each side of said cover beneath said sheet, each cable passing at least through said end ribs said locking mechanism acting on each cable to place each cable in tension to bring said end ribs into abutment with said first abutment members.

42. A bed cover assembly as defined in claim 41 wherein said locking mechanism includes a buckle associated with each cable, each said buckle being pivotally connected to one of said end ribs and moveable between unlocked and locked conditions, each cable being attached at one end to a respective said buckle and at an opposite end to another of said end ribs, each cable being placed in tension upon pivoting of said respective buckle to said locked condition.

43. A bed cover assembly as defined in claim 42 wherein each said buckle is accommodated within said one end rib when said buckle is in said locked condition.

44. A bed cover assembly as defined in claim 8 wherein each said buckle is accommodated within said one end rib when said buckle is in said locked condition.

\* \* \* \* \*